US009162719B2

(12) United States Patent
Bowers et al.

(10) Patent No.: US 9,162,719 B2
(45) Date of Patent: Oct. 20, 2015

(54) LIMBED VEHICLES, SYSTEMS AND METHODS USING SAME, AND POST NETWORKS ON WHICH LIMBED VEHICLES TRAVEL

(75) Inventors: Jeffrey A. Bowers, Kirkland, WA (US); Roderick A. Hyde, Redmond, WA (US); Muriel Y. Ishikawa, Livermore, CA (US); Jordin T. Kare, Seattle, WA (US); Clarence T. Tegreene, Bellevue, WA (US); Lowell L. Wood, Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 2068 days.

(21) Appl. No.: 12/006,052

(22) Filed: Dec. 28, 2007

(65) Prior Publication Data

US 2009/0166103 A1 Jul. 2, 2009

(51) Int. Cl.
*B62D 51/00* (2006.01)
*G06F 19/00* (2011.01)
*B62D 57/032* (2006.01)
*A01B 51/02* (2006.01)

(52) U.S. Cl.
CPC .............. *B62D 57/032* (2013.01); *A01B 51/02* (2013.01)

(58) Field of Classification Search
CPC .............................. B62D 57/032; A01B 51/02
USPC ................ 180/8.1, 8.6; 414/4, 680; 901/1, 50
See application file for complete search history.

(56) References Cited

U.S. PATENT DOCUMENTS

| 4,565,487 A * | 1/1986 | Kroczynski ................... 414/730 |
| 4,585,388 A * | 4/1986 | Gossain et al. ............... 414/735 |
| 4,612,996 A * | 9/1986 | Wolf et al. ....................... 172/26 |
| 4,637,494 A | 1/1987 | Iida et al. |
| 4,738,583 A * | 4/1988 | Macconochie et al. ....... 414/735 |
| 5,213,172 A | 5/1993 | Paris |
| 5,248,923 A | 9/1993 | Kimura et al. |
| 6,671,582 B1 | 12/2003 | Hanley |
| 6,848,856 B2 * | 2/2005 | Johnson ........................... 404/6 |

(Continued)

FOREIGN PATENT DOCUMENTS

JP            61-75075        4/1986

OTHER PUBLICATIONS

U.S. Appl. No. 12/006,079, Bowers et al.
(Continued)

*Primary Examiner* — Joseph Rocca
*Assistant Examiner* — Jacob Knutson

(57) ABSTRACT

Embodiments disclosed herein relate to systems including a limbed vehicle having a plurality of controllably movable limbs (e.g., a limbed machine, limbed robot, etc.), a plurality of spaced posts that the limbed vehicle may travel on using the limbs, and at least one logistical-support unit associated with at least one of the posts and configured to provide logistical support to the limbed vehicle. As non-limiting examples, such disclosed embodiments of systems may be used to service an agriculture field, to enable travel over an environmentally-sensitive area or an area impassable by a conventional wheeled or tracked vehicle, and may be used in many other different applications. Embodiments disclosed herein also relate to limbed vehicles configured to receive logistical support from a logistical-support unit, methods of providing logistical support to such limbed vehicles, post networks, and posts.

68 Claims, 11 Drawing Sheets

(56) References Cited

U.S. PATENT DOCUMENTS

| | | |
|---|---|---|
| 7,327,112 B1 | 2/2008 | Hlynka et al. |
| 2004/0236467 A1 | 11/2004 | Sano |
| 2005/0228539 A1 | 10/2005 | Takenaka et al. |
| 2006/0076167 A1* | 4/2006 | Setrakian et al. ............... 180/8.1 |

OTHER PUBLICATIONS

U.S. Appl. No. 12/006,081, Bowers et al.

Balaguer et al.; "A climbing autonomous robot for inspection applications in 3D complex environments"; Robotica; May 2000; pp. 287-297; vol. 18, Issue 03; Cambridge Journals.

\* cited by examiner

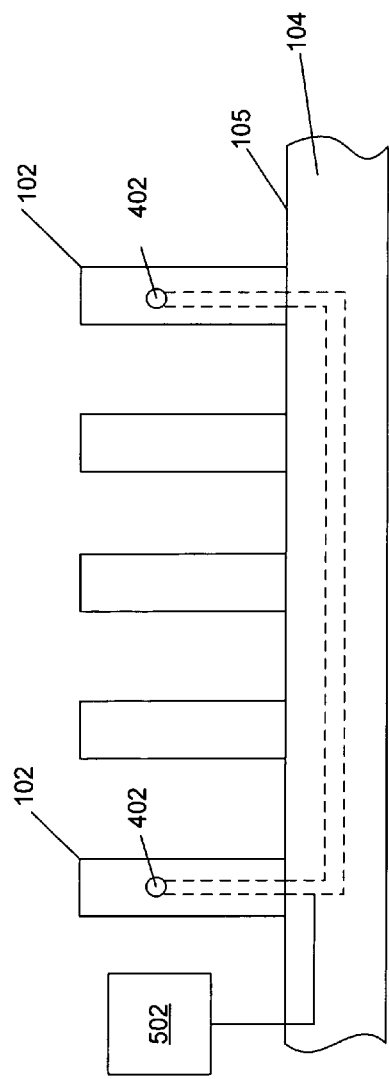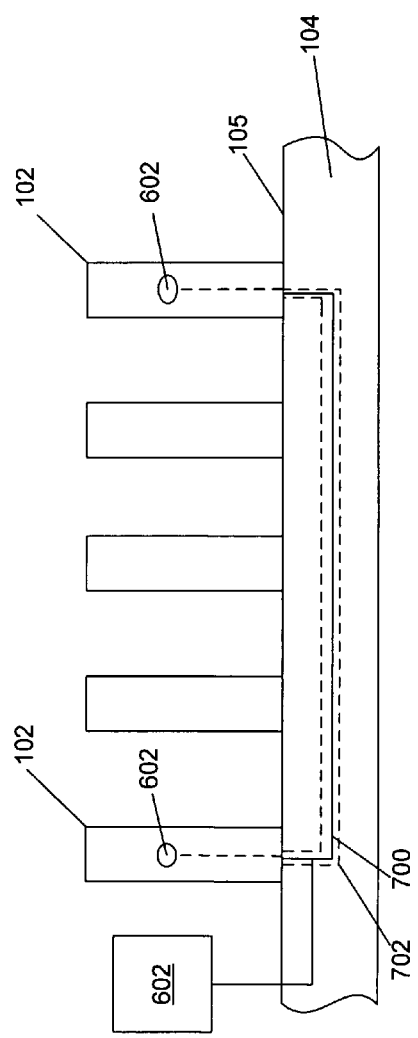

LIMBED VEHICLES, SYSTEMS AND METHODS USING SAME, AND POST NETWORKS ON WHICH LIMBED VEHICLES TRAVEL

CROSS-REFERENCE TO RELATED APPLICATIONS

The present application is related to U.S. patent application Ser. No. 12/006,079 entitled SYSTEMS AND METHODS EMPLOYING LIMBED VEHICLE AND SPACED POSTS, naming Jeffrey A. Bowers, Roderick A. Hyde, Muriel Y. Ishikawa, Jordin T. Kare, Clarence T. Tegreene, Lowell L. Wood Jr., and Victoria Y. H. Wood as inventors, filed on Dec. 28, 2007.

The present application is related to U.S. patent application Ser. No. 12/006,081 entitled LIMBED VEHICLES, SYSTEMS AND METHODS USING SAME, AND POST NETWORKS ON WHICH LIMBED VEHICLES TRAVEL, naming Jeffrey A. Bowers, Roderick A. Hyde, Muriel Y. Ishikawa, Jordin T. Kare, Clarence T. Tegreene, Lowell L. Wood Jr., and Victoria Y. H. Wood as inventors, filed on Dec. 28, 2007.

SUMMARY

According to one embodiment, a system includes, but is not limited to, a limbed vehicle including a plurality of controllably movable limbs, a plurality of spaced posts configured to support the limbed vehicle as the limbed vehicle travels thereon using the controllably movable limbs, and at least one logistical-support unit. The at least one logistical-support unit may be associated with at least one of the plurality of spaced posts and configured to provide logistical support to the limbed vehicle.

According to another embodiment, a limbed vehicle includes, but is not limited to, a plurality of controllably movable limbs, a drive system configured to move the controllably movable limbs to allow travel on a plurality of spaced posts, a battery coupled to the drive system, and a power receiver coupled to the battery. The power receiver is configured to be coupled to a power transmitter associated with at least one of the plurality of spaced posts so that the battery may be charged.

According to another embodiment, a method includes, but is not limited to, directing a limbed vehicle to travel on a plurality of spaced posts. The method further includes, but is not limited to, receiving, at the limbed vehicle, logistical support from a logistical-support unit associated with at least one of the plurality of spaced posts.

According to another embodiment, a post network includes, but is not limited to a plurality of spaced posts configured to support a limbed vehicle as the limbed vehicle travels thereon, and at least one logistical-support unit associated with at least one of the posts. The logistical-support unit is configured to provide logistical support to the limbed vehicle.

The foregoing is a summary and thus contains, by necessity, simplifications, generalizations and omissions of detail. Consequently, those skilled in the art will appreciate that the summary is illustrative only and is NOT intended to be in any way limiting. Other aspects, features, and advantages of the systems, limbed vehicles, post networks, posts, or methods described herein, as defined by the claims, will become apparent in the detailed description set forth herein.

BRIEF DESCRIPTION OF THE DRAWINGS

FIG. 5 is a schematic side elevation view of underground fluid conduit operably coupled to selected logistical-support units shown in FIG. 4 according to one embodiment.

FIG. 7 is a schematic side elevation view of underground electrical wires operably coupled to selected logistical-support units shown in FIG. 6 according to one embodiment.

DETAILED DESCRIPTION

Figure 1A:
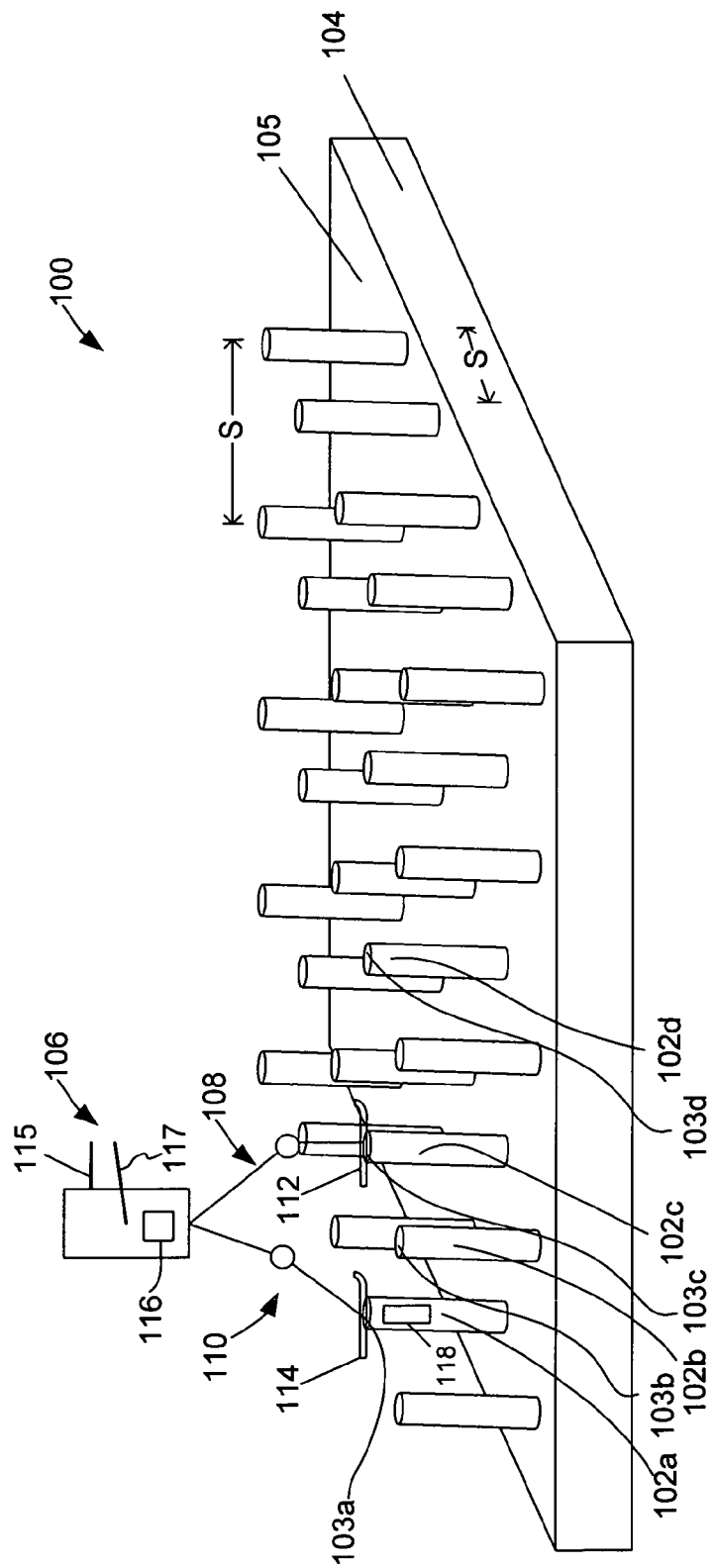
FIG. 1A is a schematic perspective view of one embodiment of a system that includes a plurality of spaced posts distributed over a surface and a limbed vehicle configured to travel on the posts, wherein at least one of the posts is associated with a logistical-support unit and the limbed vehicle includes a logistical-support interface configured to receive logistical support from the logistical-support unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Embodiments disclosed herein are directed to systems including a limbed vehicle having a plurality of limbs (e.g., a limbed machine, limbed robot, etc.) and a plurality of spaced posts on which the limbed vehicle may travel using the limbs. At least one of the posts may be associated with a logistical-support unit configured to provide logistical support to the limbed vehicle, such as providing fuel or other consumable (e.g., a petroleum-based fuel or electrical power), off-loading of objects carried by the limbed vehicle, or swappable equipment modules that the limbed vehicle may use. As used herein, the term "fuel" includes, but is not limited to, petroleum-based fuels (e.g., gasoline or natural gas), electrical power, or any other suitable fuel capable of powering a limbed vehicle. As non-limiting examples, such systems may be used to service an agriculture field, to travel over an environmentally-sensitive area, to travel over an area impassable by a conventional wheeled or tracked vehicle, or in many other different applications. Embodiments disclosed herein are also directed to limbed vehicles configured to receive logistical support and post networks configured to provide logistical support to a limbed vehicle traveling thereon. As used herein, phrases such as "travel on a plurality of posts" or similar phrases such as "a plurality of posts on which the limbed vehicle travels" include, but are not limited to, the limbed vehicle making contact with the posts at a distal end of the post as well as making contact with any other portion of a post, including a side of a post.

FIG. 1A is schematic perspective view of a system 100 according to one embodiment. The system 100 includes a plurality of spaced posts 102 (only posts 102a-102d are labeled in FIG. 1A for simplicity) that may be at least partially disposed within a medium 104 (for example, and not limited to, the ground) having a surface 105. At least one post 102 may be a solid, elongated member, a generally tubular member, or another structural member having any suitable configuration. For example, at least one post 102 may be fabricated from polyvinyl chloride ("PVC"), steel, aluminum, composite materials, or another suitable structural material. At least one post 102 may be installed using a directional boring machine, a pneumatically or hydraulically actuated post-driving machine, or another suitable technique.

The posts 102 may be at least partially embedded within the medium 104 and may project outwardly from, beyond, or above the surface 105, and further may be spaced from an adjacent post 102 by a post spacing S. However, in some embodiments the spacing between adjacent posts 102 may not be uniform and the spacing may be tailored for specific types of applications. At least one post 102 includes a limb-interfacing surface 103 (only limb-interfacing surfaces 103a-103d are labeled in FIG. 1A for simplicity) suitably configured to interface with a limbed vehicle 106. Although FIG. 1A shows respective posts 102 extending above the surface 105 about the same distance, in any of the embodiments disclosed herein, at least some of the posts 102 may extend above the surface 105 different distances. For example, respective posts 102 may have different lengths or may be driven into the medium 104 to different depths. Furthermore, in any of the embodiments disclosed herein, at least one, some, or all of the limb-interfacing surfaces 103 may be located substantially at or recessed below the surface 105 of the medium 104.

Still referring to FIG. 1A, the limbed vehicle 106 of the system 100 is configured to travel on the posts 102 and over the medium 104. The limbed vehicle 106 includes a plurality of controllably movable limbs depicted in the FIGS. 1A and 1B as two controllably movable legs 108 and 110 and two controllably movable arms 115 and 117, at least one of which may include a multi-fingered hand (not shown) or other end effector. Suitable types of limb structures include, but are not limited to, vertebrate-style limbs, limbs with one or more linear degrees of freedom, pneumatic or hydraulic tentacles, wheel- or track-limb hybrids having a rotating structure supporting multiple jointed limbs, or another suitable limb structure. While the Figures herein depict limbed vehicles (e.g., the limbed vehicle 106) comprising four controllably movable limbs for simplicity, it is contemplated that the limbed vehicles described herein may comprise at least two limbs. For example, the limbed vehicle 106 or other limbed vehicle described herein may include three, four, five, six, seven, eight, or more, controllably movable limbs. An example of a limbed vehicle configured as a mobile biped vehicle is disclosed in U.S. Patent Application Publication 20050228539 ("'539 Application"), which is incorporated herein by reference. In one embodiment, the legs 108 includes a foot 112 and the legs 110 includes a foot 114 on which the limbed vehicle 106 may travel by moving the limbs 108 and 110 in a walking motion, and at least one of the feet 112 and 114 may be configured, for example, as disclosed in the '539 Application.

The limbed vehicle 106 may include a logistical-support interface 116 configured to interface with one or more logistical-support units 118 associated with the posts 102 (e.g., the logistical-support unit 118 associated with the post 102a). The functionality of the logistical-support interface 116 and the logistical-support unit 118 will be described in more detail with respect to FIGS. 4-10. For example, the logistical-support unit 118 may provide fuel to the limbed vehicle 106 via the logistical-support interface 116, provide electrical power to the limbed vehicle 106 via the logistical-support interface 116, off-load objects carried by the limbed vehicle 106, or install or replace swappable equipment modules having specific functionalities that the limbed vehicle 106 may employ.

Figure 1B:
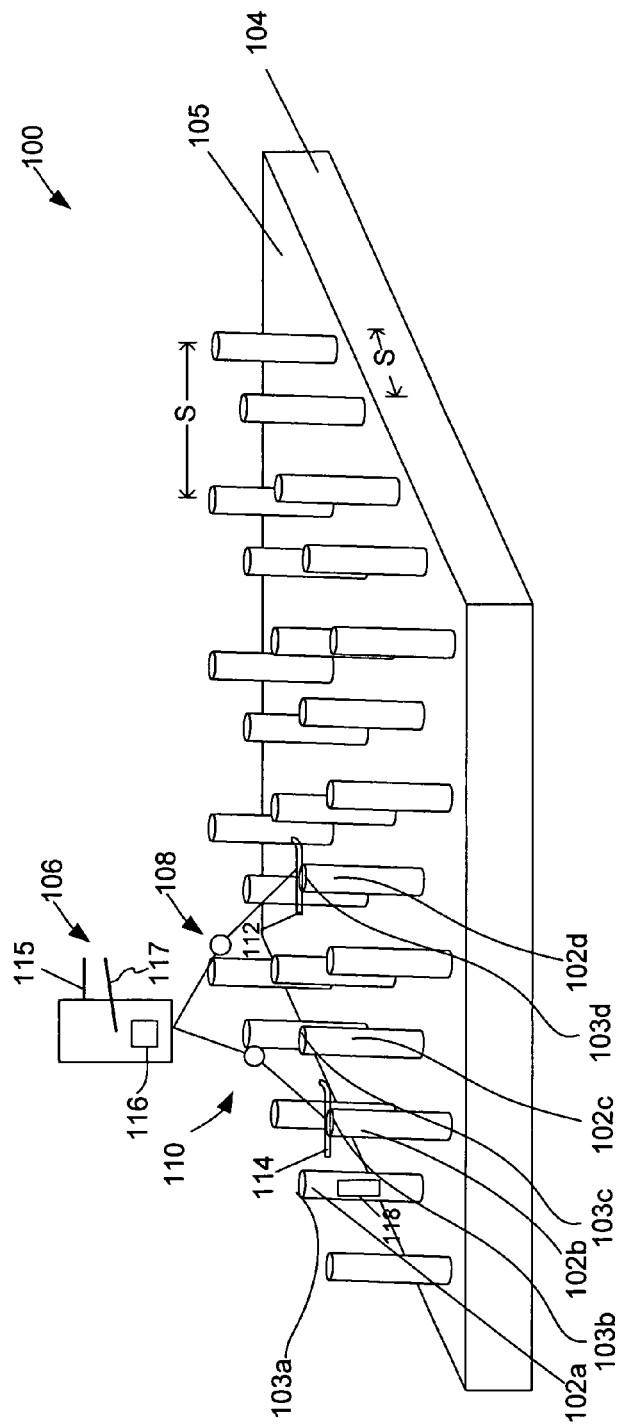
FIG. 1B is a schematic perspective view of the system shown in FIG. 1A, with the limbed vehicle having moved to be supported by different posts.

The limbed vehicle 106 may be operated in a manner so that at least one leg 110 and 112 is directed to move from one post 102 onto another one of the posts 102 in a walking motion. For example, as shown in FIG. 1B, the leg 110 may be directed to move so that the foot 114 thereof is moved from limb-interfacing surface 103a of post 102a on which it is supported (See FIG. 1A) onto limb-interfacing surface 103b of post 102b, followed by directing the leg 108 to move so that the foot 112 thereof is moved from limb-interfacing surface 103c of post 102c on which it is supported (See FIG. 1A) onto limb-interfacing surface 103d of post 102d. Such motion may be continued until the limbed vehicle 106 has reached a desired destination over the medium 104. In certain embodiments, the limb-interfacing surface 103 of the posts 102 may have a large enough surface area relative to the size of the feet 112 and 114 of the limbed vehicle 106 so that both of the feet 112 and 114 may be positioned on a single one of the posts 102 to support the limbed vehicle 106 thereon. Thus, in such an embodiment, the limbed vehicle 106 may be directed to travel from one of the posts 102 that supports the entire weight of the limbed vehicle 106 to another one of the posts 102 that also supports the entire weight of the limbed vehicle 106 or the leg 108 and 110 may be directed to independently move in a manner so that the leg 108 is supported by one of the posts 102 and the limb 110 is supported by a different one of the posts 102.

Figure 2:
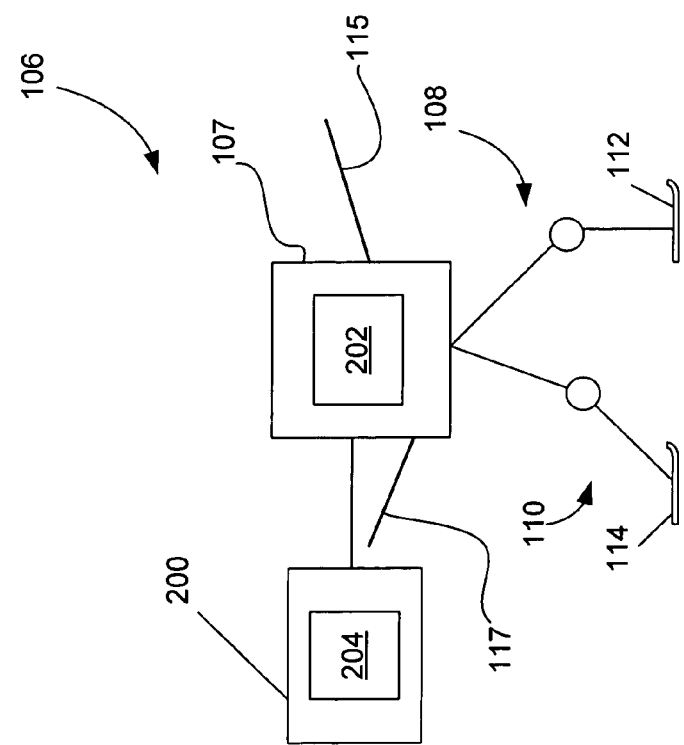
FIG. 2 is a diagrammatic view of a remotely controlled limbed vehicle that may be employed in the system shown in FIG. 1A according to one embodiment.

The limbed vehicle 106 may be remotely controlled, may be driven by an operator that rides in or on the limbed vehicle 106, or may be programmed to travel along a route. For example, FIG. 2 is a diagrammatic view of the limbed vehicle 106 operatively coupled to a remote-control system 200 according to another embodiment. The limbed vehicle 106 includes a controller 202 disposed within or on a vehicle body 107. The remote-control system 200 is operatively coupled, or connected, to the controller 202 of the limbed vehicle 200 via a wireless communication link (e.g., radio-frequency communication, optical communication, etc.) or a wired communication link (e.g., a flexible cable connection). The remote-control system 200 includes an operator interface 204, such as joystick, keyboard, touchscreen monitor, combinations of any of the foregoing, or other input device that, responsive to an operator's input, directs the operation of the vehicle 106 and, in particular, the movement of the legs 108 and 110. In operation, the remote-control system 200 communicates instructions responsive to operator input via the operator interface 204 to the controller 202 of the limbed vehicle 106 that directs the operation of a drive system (e.g., a battery-powered drive system or a fuel-powered drive system) of the limbed vehicle 106 to cause independent movement of the legs 108 and 110, and arms 115 and 117.

Figure 3:
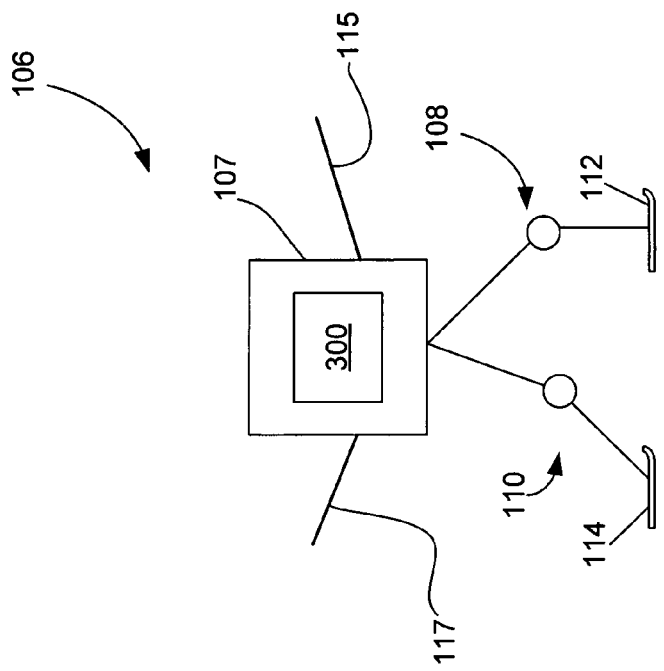
FIG. 3 is a diagrammatic view of a limbed vehicle in which an operator may ride therein or thereon, and direct the operation thereof according to another embodiment.

Referring to FIG. 3, in other embodiments, the limbed vehicle 106 may include provisions (not shown) for an operator to ride therein or thereon, and control the limbed vehicle. For example, the vehicle body 107 may be configured to support an operator and an operator interface 300 that is operatively coupled to the limbed vehicle's drive system (not shown). The operator interface 300 may include a joystick, touchscreen, wheel and pedal combination similar to a conventional automotive vehicle, keyboard, combinations of the foregoing, or other input device. The operator may direct the legs 108 and 110, and arms 115 and 117 to be selectively moved via the operator interface 300 to enable the limbed vehicle 106 to move at least one foot 112 and 114 from corresponding posts to other corresponding posts or to a common post, as desired, and previously described with respect to FIGS. 1A and 1B.

In a further embodiment, a limbed vehicle may include a robotic control system configured to automatically direct the movement of the controllably movable limbs and other operations of the limbed vehicle.

Figure 4:
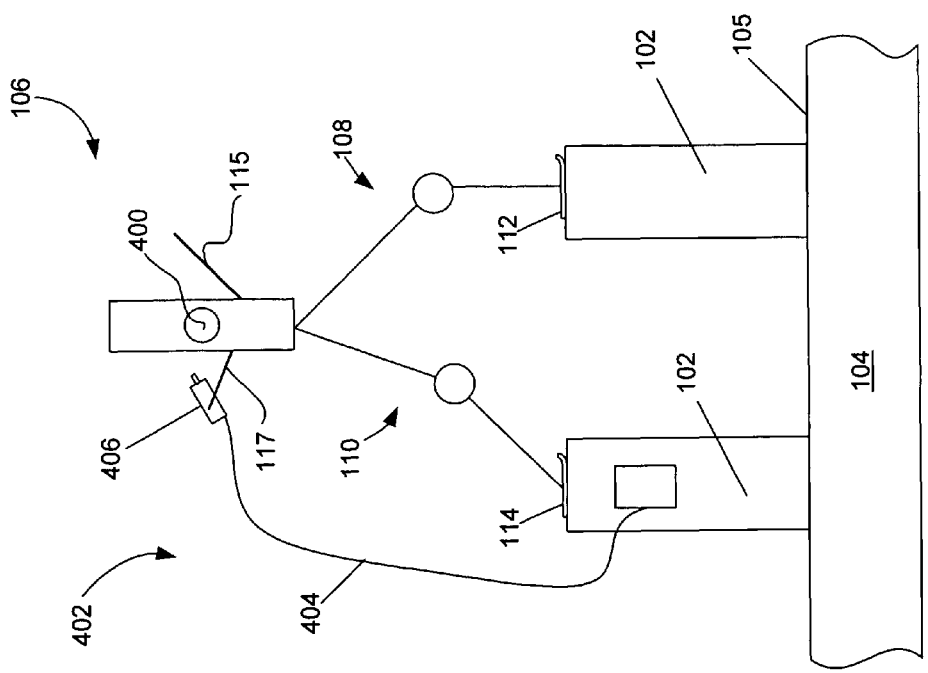
FIG. 4 is a schematic side elevation view of the limbed vehicle shown in FIG. 1A including a logistical-support interface and a logistical-support unit configured to provided fuel or other consumable and associated with one of the posts supporting the limbed vehicle according to one embodiment.

Referring to FIG. 4, one embodiment of a logistical-support interface and a corresponding logistical-support unit that may be used in conjunction with the limbed vehicle 106 is depicted. The limbed vehicle 106 may include a logistical-support interface 400 configured as a fuel port in fluid communication with a fuel tank (not shown) of the limbed vehicle 106 that powers a drive system (not shown) thereof. One or more of the posts 102 may be associated with a logistical-support unit 402 (i.e., a fuel-supply device) comprising a fuel line 404 in fluid communication with a fuel source (not shown) and associated nozzle 406 that is operably coupled to the fuel line 404. For example, the fuel source may be included in one of the posts 102 or may be remote from the posts 102. The limbed vehicle 106 may re-fuel with a petroleum-based fuel (e.g., gasoline or natural gas), or other fuel by stopping on one or more of the posts 102, grasping the nozzle 406 with one of the controllably movable arms 115 or 117, inserting the nozzle 406 into the fuel port, and enabling fuel to flow through the nozzle 406 into a fuel tank (not shown) of the limbed vehicle 106. In certain embodiments, in addition to or as an alternative to providing fuel, the logistical-support unit 402 may be configured to provide a consumable other than fuel to the limbed vehicle 106, such as providing lubricating oil, compressed air, window-washing fluid, or other consumable to assist with the operation of the limbed vehicle 106. The logistical-support unit 402 may also be configured to provide a consumable to the limbed vehicle 106 that may be dispensed by the limbed vehicle 106, such as providing seeds, fertilizer, pesticide, or another suitable consumable. In a further embodiment, the logistical-support unit 402 may be configured to remove waste from the limbed vehicle 106, such as used oil, wastewater from cleaning operations, plant clippings from use in agricultural applications, or other waste.

In some embodiments, a plurality of the logistical-support units 402 may be provided, with at least one logistical-support unit 402 associated with at least one of the posts 102, enabling the range of the limbed vehicle 106 to be increased. In some embodiments, fuel provided by the logistical-support unit 402 may be used to charge a battery of the limbed vehicle 106, which the limbed vehicle 106 uses to power its drive system (not shown) for controllably moving at one of the limbs 108 and 110.

Referring to FIG. 5, in one embodiment, fuel or other consumable may be provided through fluid conduits 500 integrated with the posts 102. The fluid conduits 500 may be disposed within the medium 104 and provide fuel to a selected one or more of the posts 102. For example, as illustrated, the fluid conduit 500 may run underground and into two of the posts 102 so that fuel or other consumable may be provided to the selected posts 102 from a source 502 (e.g., a fuel or other consumable source) and the logistical-support unit 402 associated therewith. In other embodiments, a network of fluid conduits may be provided in conjunction with pumps (as needed or desired) to route fuel or other consumables to more than two of the posts 102.

Figure 6:
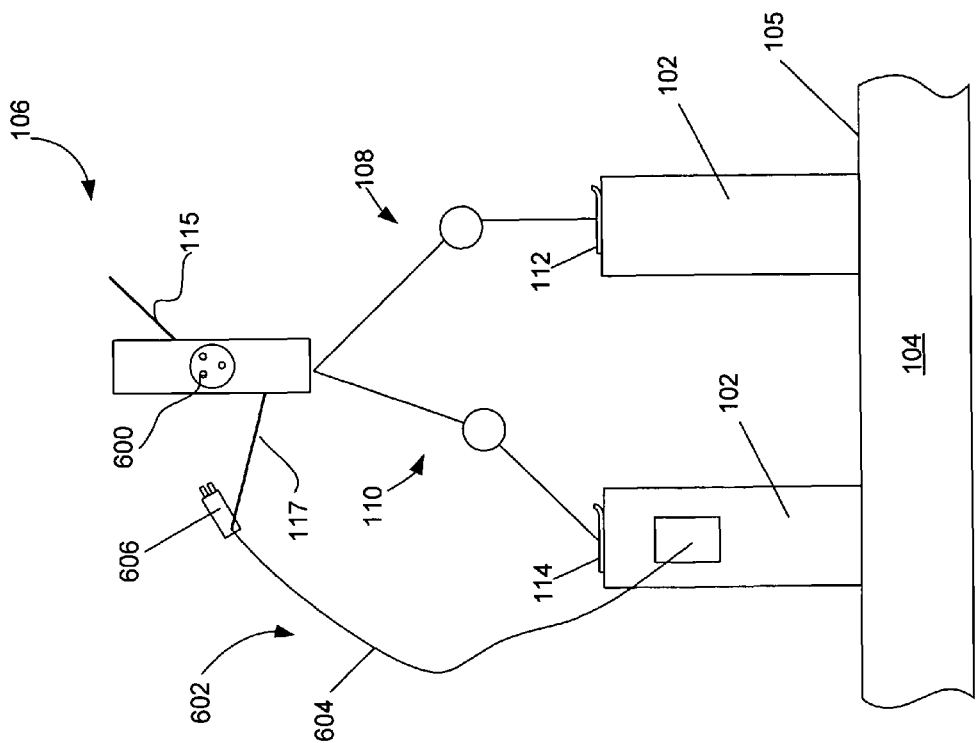
FIG. 6 is a schematic side elevation view of the limbed vehicle shown in FIG. 1A including a logistical-support interface and a logistical-support unit configured to provide electrical power and associated with one of the posts supporting the limbed vehicle according to another embodiment.

Referring to FIG. 6, another embodiment of a logistical-support interface and a corresponding logistical-support unit that may be used in conjunction with the limbed vehicle 106 is depicted. The limbed vehicle 106 may include a logistical-support interface 600 (i.e., an electricity-receiving mechanism/power receiver) configured as an electrical socket, contact point(s), or other electricity-receiving mechanism. One or more of the posts 102 may be associated with a logistical-support unit 602 comprising an electrical line 604 electrically coupled to an electrical power supply (not shown) and associated electrical plug or contact point(s) 606 electrically coupled to the electrical line 604. For example, the electrical power supply may be included in one of the posts 102 or may be remote from the posts 102. The limbed vehicle 106 may re-charge its battery (not shown) that powers a drive system (not shown) thereof by stopping on one or more of the posts 102, grasping the electrical plug 606 with one of the controllably movable arms 115 or 117, electrically connecting the electrical plug 606 with the electrical socket to charge the battery. In some embodiments, at least one of the feet 112 and 114 may include a contact point(s) that is configured to electrically connect with an electricity-transmitting mechanism/power transmitter included in or associated with at least one of the posts 102. In such an embodiment, the limbed vehicle 106 may re-charge its battery by stepping on at least one of the posts 102 to cause the contact point(s) to electrically connect with the electricity-transmitting mechanism. In some embodiments, a plurality of the logistical-support units 602 may be provided, with at least one logistical-support unit 602 associated with at least one of the posts 102, enabling the range of the limbed vehicle 106 to be increased.

Referring to FIG. 7, in one embodiment, electricity may be provided through electrical wiring 700 integrated with the posts 102. The electrical wiring 700 may be disposed within the medium 104 and provide electrical power to a selected one or more of the posts 102. For example, as illustrated, the electrical wiring 700 may run underground through conduits 702 and into two of the posts 102 so that electricity may be provided from an electrical power supply 602 to the selected posts 102 and the logistical-support unit 602 associated therewith. In other embodiments, a network of electrical wiring may be provided to route electricity to more than two of the posts 102.

In other embodiments, one or more of the posts 102 may include self-contained electrical-power sources. For example, at least one of the posts 102 may include a battery that is charged via solar cells that are located on or nearby the at least one of the posts 102. In other embodiments, the battery may be charged by a wind-powered generator (e.g., a wind-powered turbine) or another suitable energy source.

Figure 8:
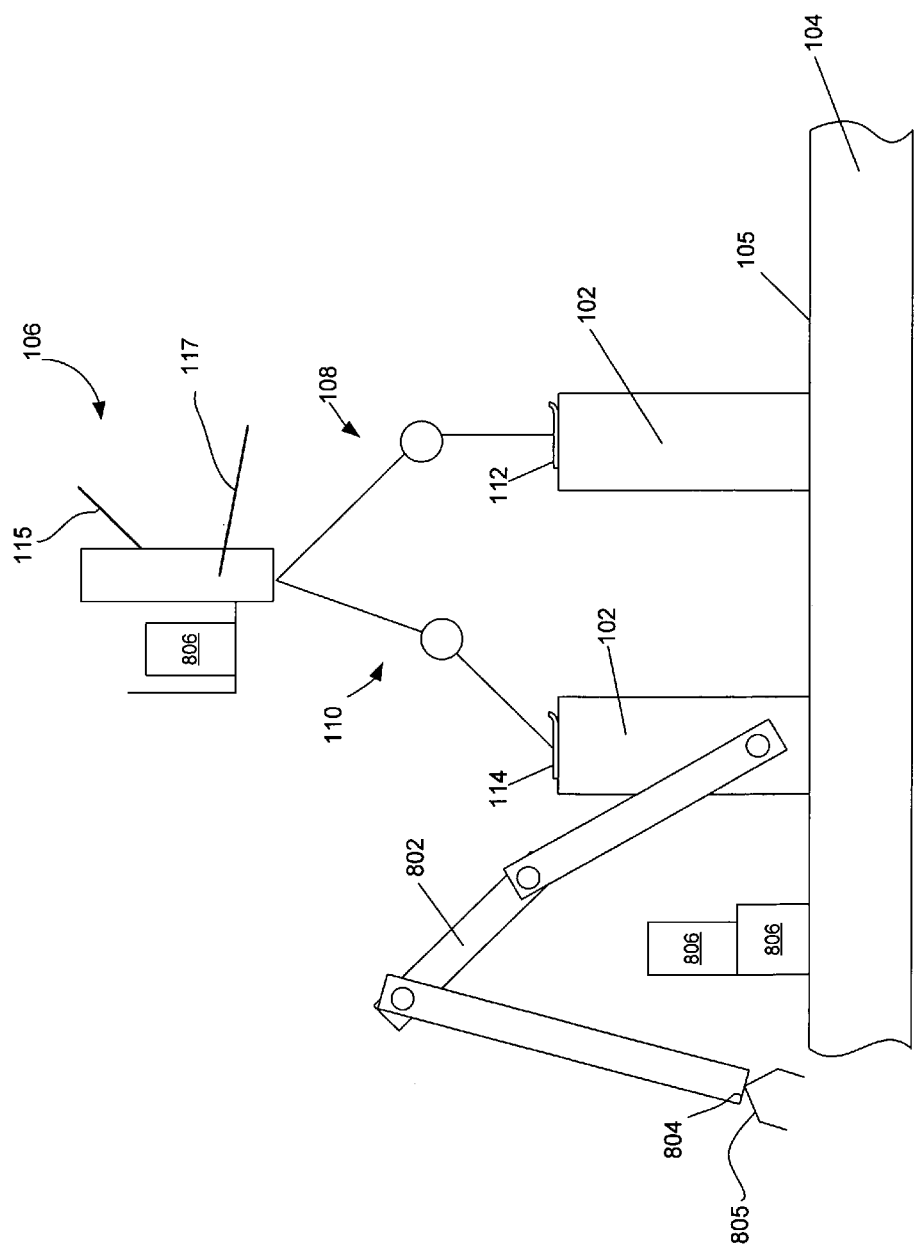
FIG. 8 is a schematic side elevation view a loading unit associated with one of the posts configured to load objects onto a limbed vehicle and un-load objects being carried by the limbed vehicle according to another embodiment.

Referring to FIG. 8, in another embodiment, one or more of the posts 102 may be attached to, integrated with, positioned in proximity to, or associated with a loading unit 800 (i.e., a logistical-support unit) configured to load objects onto the limbed vehicle 106 and un-load objects being carried by the limbed vehicle 106. The loading unit 800 may include a controllably movable arm 802 (e.g., a robotic arm of a robotic system) configured to be independently moved in three axes. An end 804 of the arm 802 may include a gripping mechanism 805, such as a vacuum suction device or a mechanical gripping mechanism, configured to pick-up and carry at least one object 806.

In one mode of operation, the gripping mechanism 805 of the loading unit 800 may load one of the objects 806 onto the limbed vehicle 106 while the limbed vehicle 106 is stopped and supported on one or more of the posts 102. In another mode of operation, the loading unit 800 may off-load objects 806 carried by the limbed vehicle 106 onto a conveyor (not shown) or onto a loading area.

Figure 9:
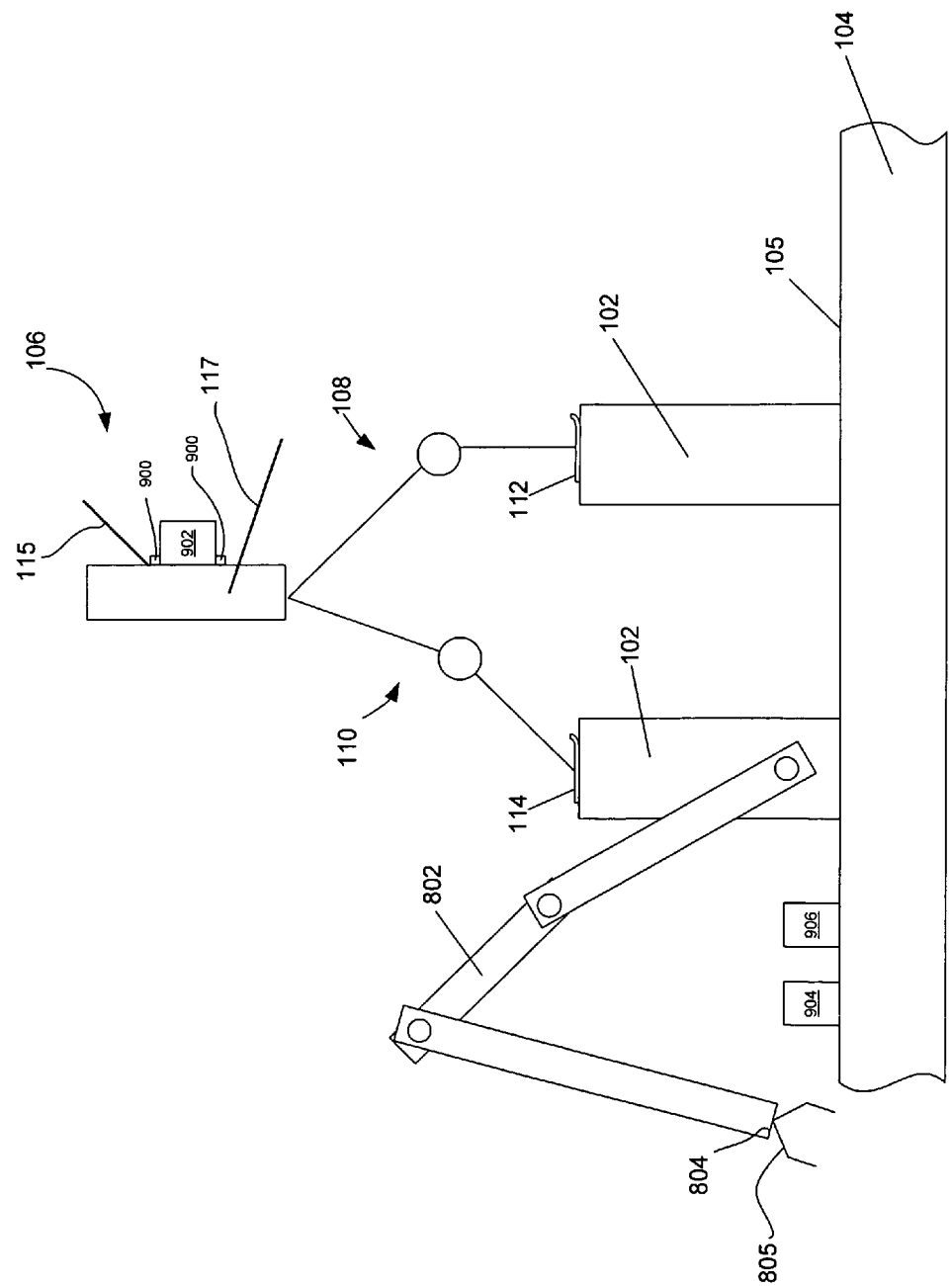
FIG. 9 is a schematic side elevation view a loading unit associated with one of the posts configured to load equipment modules onto a limbed vehicle and un-load equipment modules being carried by the limbed vehicle according to another embodiment.

Referring to FIG. 9, another embodiment relates to providing equipment modules to the limbed vehicle 106 using the loading unit 800. In this embodiment, the limbed vehicle 106 includes an equipment-module attachment mechanism 900 configured to engage an equipment module 902 so that the equipment module 902 may be removeably attached to the limbed vehicle 106. For example, the equipment-module attachment mechanism 900 may be a magnetic mechanism (e.g., a permanent magnet), an electromagnetic mechanism (e.g., an electromagnet), or a mechanical coupling (e.g., a mechanical locking mechanism) configured to retain the equipment module 902 on the limbed vehicle 106.

The loading unit 800 is configured to pick-up the equipment module 902 using the gripping mechanism 805, and install the equipment module 902 on the limbed vehicle 106 by engaging the equipment-module attachment mechanism 900 with the equipment module 902. For example, the equipment-module attachment mechanism 900 may be actuated via the remote-control system 300 shown in FIG. 2 or via the operator interface 300 shown in FIG. 3. The loading unit 800 may similarly remove the equipment module 902 from the limbed vehicle 106 and install another equipment module 904 or 906.

At least one of the equipment modules 902, 904, or 906 may have a different functionality. At least one of the equipment modules 902, 904, or 906 may be configured as an implement such as, an agriculture tool or other selected implement. For example, the agriculture tool may be a dispenser configured to apply reagents or substances to an agriculture field or crops, such as fertilizer, pesticide, herbicide, seeds, or another suitable reagent or substance. In one embodiment, the equipment module (e.g., the equipment module 902) mounted to the limbed vehicle 106 may be operably coupled to, for example, the controller 202 shown in FIG. 2 or the operator interface 300 shown in FIG. 3 so that the operation of the equipment module may be controlled by the operator. In some embodiments, any of the equipment modules 902, 904, and 906 may be carried by at least one of the arms 115 and 117 of the limbed vehicle 106. In such an embodiment, at least one arm 115 and 117 may include the equipment-module attachment mechanism 900 or at least one arm 115 and 117 may include a multi-fingered hand (not shown) configured to grip any of the equipment modules 902, 904, and 906.

Figure 10:
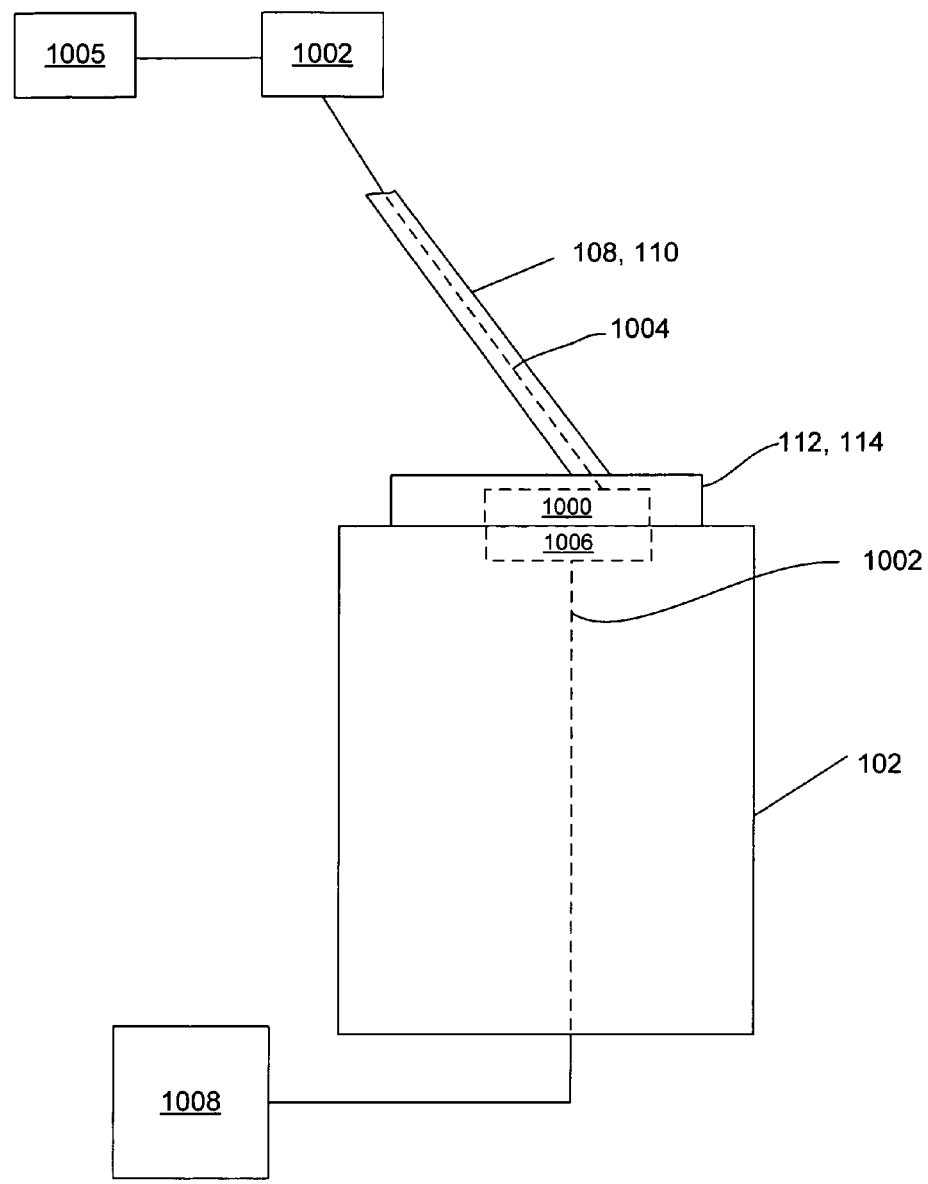
FIG. 10 is a schematic view of a post associated with a power transmitter and a leg of a limbed vehicle in contact with the post that includes a power receiver for charging a battery of the limbed vehicle according to another embodiment.

Referring to FIG. 10, in another embodiment, a logistical-support unit may be integrated with a post of a post network and configured as a power transmitter so that the limbed vehicle 106 may receive electrical power when, for example, at least one of the feet 112 or 114 is positioned in sufficient proximity to one or more of the posts 102. In such an embodiment, at least one of the feet 112 and 114 may include a power receiver/logistical-support interface 1000 (e.g., a wireless receiver) electrically coupled to a battery 1002 of the limbed vehicle 106 via electrical circuitry 1004 that may be included in a corresponding one of the limbs 108 or 110. The battery 1002 powers a drive system 1005 of the limbed vehicle 106 that moves the legs 108 and 110, and the arms 115 and 117. For example, in one embodiment, the power receiver 1000 may be configured as a wireless inductive receiver that includes a secondary magnetic coil. A power transmitter/logistical-support unit 1006 (e.g., a wireless inductive transmitter including a primary magnetic coil of an inductive transmitter) may be operably coupled to the power receiver 1000. The power receiver 1000 may be included in or otherwise associated with one of the posts 102. For example, when the power receiver 1000 is configured as a wireless inductive receiver and the power transmitter 1006 is configured as a wireless inductive transmitter, the wireless inductive receiver may have a current generated therein responsive to a magnetic field generated by a primary magnetic coil of the wireless inductive transmitter. The magnetic field of the wireless inductive transmitter may be generated by passing current therethrough from an electrical power source 1008. The magnetic field of the wireless inductive transmitter is inductively coupled to the wireless inductive receiver, which induces a current therein that is transmitted to the battery 1002 via the electrical circuitry 1004 to charge the battery 1002.

In operation, the limbed vehicle 106 may stop on at least one of the posts 102 so that the power receiver 1000 is positioned in sufficient proximity to the power transmitter 1006 to couple (e.g., inductively couple) the power receiver 1000 to the power transmitter 1006, and automatically and wirelessly charge the battery 1002 of the limbed vehicle 106. It should be noted that one or more of the posts 102 may include power transmitters 1006 so that the limbed vehicle 106 may re-charge the battery 1002 thereof, as desired or needed, at various locations throughout a post network.

In some embodiments, a limbed vehicle and a logistical-support unit associated with at least one post of a post network may communicate with each other via, for example, a wireless or wired connection. For example, the logistical-support unit may be configured to provide information to the limbed vehicle associated with the logistical support capability of the logistical-support unit, such as the type of logistical-support that the logistical-support unit is configured to provide. For example, the information may be communicated to a controller of the limbed vehicle. In one embodiment, the limbed vehicle may be configured to request such information from the logistical-support unit. In other embodiments, the logistical-support unit may automatically communicate the information to the limbed vehicle and the controller of the limbed vehicle may direct operation thereof responsive to the information.

The various disclosed embodiments of systems, limbed vehicle, post networks, and posts may be employed in a variety of different application environments. Turning again to FIG. 1A, for example, the medium 104 may be an environmentally-sensitive region (e.g., wetland, riverbed, lakebed, marsh, grass land, forest, a region or area provided environmental protection by a governmental entity, etc.) and, thus, the surface 105 may be an environmentally-sensitive area. In such an embodiment, the posts 102 may enable the limbed vehicle 106 to travel over the environmentally-sensitive area without causing substantially any damage so that, for example, equipment and/or supplies may be transported. In another embodiment, the medium 104 may be an ocean, sea, lake, or other liquid body and the posts 102 extend above, or limb-interfacing surfaces 103 thereof are located below or substantially at a surface of the liquid body to enable the limbed vehicle 106 to travel over the liquid body. In yet another embodiment, the medium 104 may be a substantially impassable with a conventional wheeled or tracked vehicle (e.g., an automobile or a tractor). For example, the medium 104 may be a marsh area, a swamp, closely-spaced trees, or other medium that is substantially impassable by a conventional wheeled or tracked vehicle. In such an embodiment, the system 100 or any other system described herein may enable transport of goods, people, etc. over the medium 104 in an efficient manner. In other embodiments, the medium 104 may be an agricultural field.

Figure 11A:
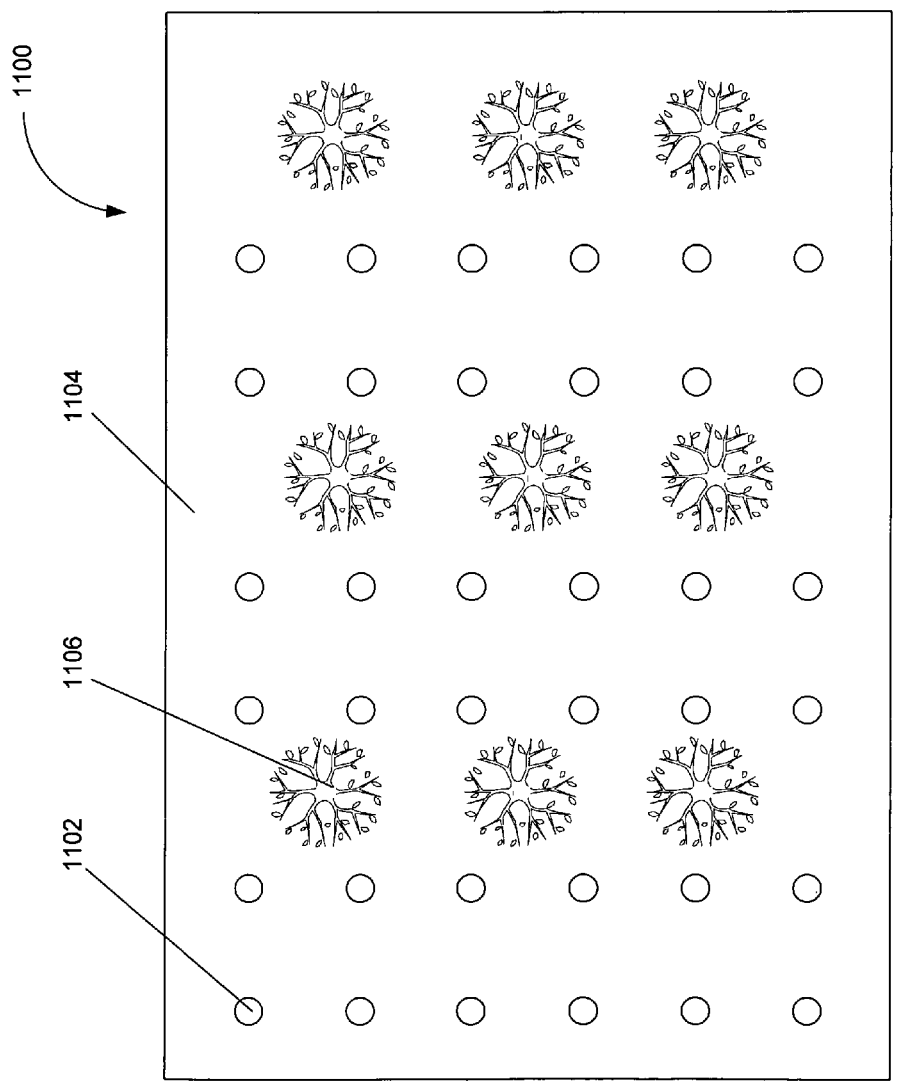
FIG. 11A is a schematic plan view of one embodiment of a system including a plurality of spaced posts that are distributed in an agriculture field so that a limbed vehicle may travel through or over the agriculture field using the posts.
Figure 11B:
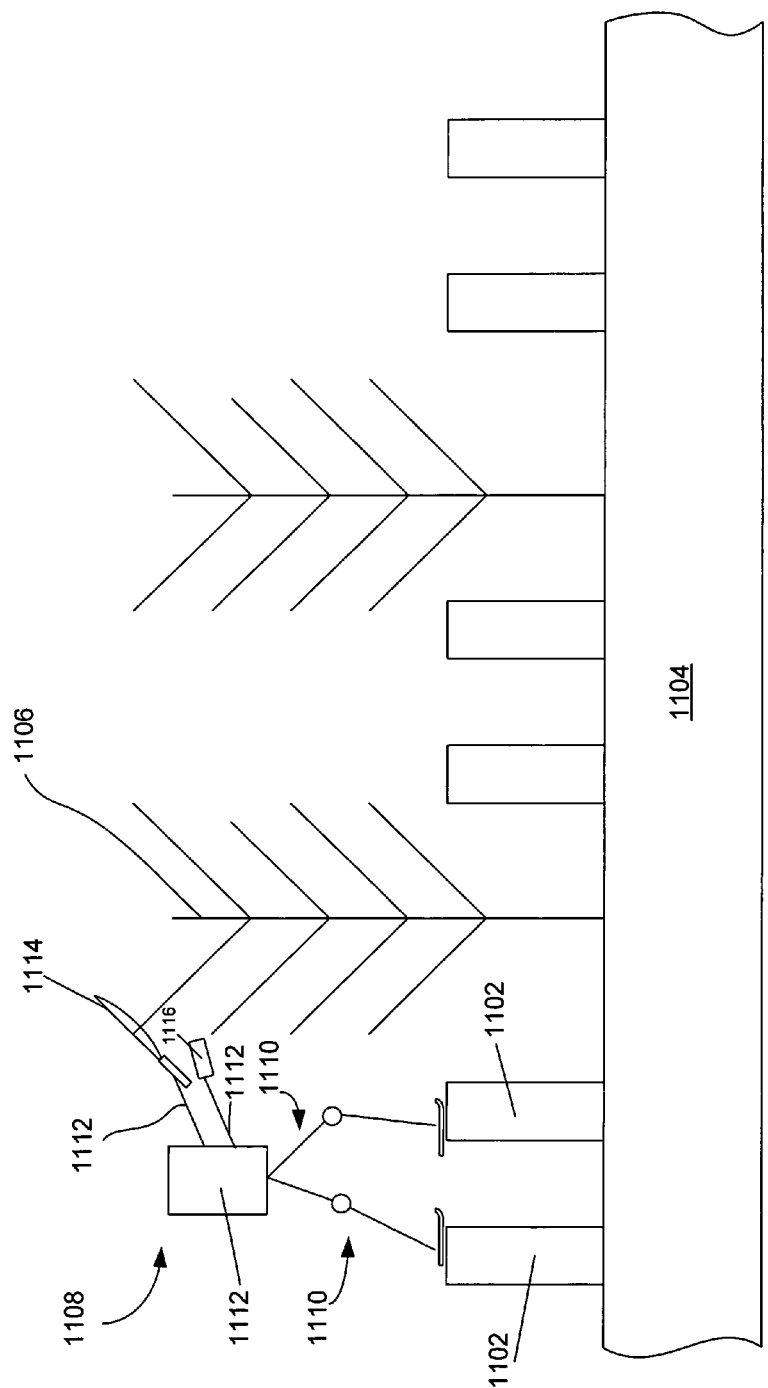
FIG. 11B is a schematic side elevation view of the system shown in FIG. 11A depicting the limbed vehicle supported on two of the posts and servicing one of the crops of the agriculture field.

FIGS. 11A and 11B depict an embodiment of a system 1100 employed in an agriculture environment. The system 1100 includes a plurality of spaced posts 1102 that may be arranged in rows and columns. For example, two rows of posts 1102 may be positioned in an agriculture field 1104 on either side of a row of crops 1106. One or more of the posts 1102 may be associated with a logistical-support unit (not shown), such as the logistical-support units 402 (FIG. 4), 602 (FIG. 6), or 800 (FIG. 8), or the wireless transmitter 1006 (FIG. 10). As shown in the schematic side elevation view of the system 1100 in FIG. 11B, the posts 1102 are disposed within the agriculture field 1104 using any of the previously described installation techniques and extends a sufficient distance above the agriculture field 1104 so that a limbed vehicle 1108 of the system 1100 that travels thereon may access the crops 1106.

Still referring to FIG. 11B, the limbed vehicle 1108 may include a plurality of controllably movable legs 1110 projecting from a vehicle body 1112. One of the legs 1110 is shown supported by one of the posts 1102 and the other leg 1110 is shown supported by another one of the posts 1102. However, in some embodiments, the limbed vehicle 1108 may include more than two legs (e.g., four legs), and at least one of the four legs may be supported by a corresponding post 1102 to provide increased stability. The limbed vehicle 1108 may also include a plurality of arms 1112. For example, one or more of the arms 1112 may include a gripping mechanism, such as multi-fingered hand. One of the arms 1112 may also hold an agriculture tool 1114 (e.g., shears, a dispenser, or other suitable tool) and the other arm 1112 may carry an end effector 1116 that may be configured to operate in conjunction with the agriculture tool 1114. For example, the end effector 1116 may comprise a vacuum tool, a multi-fingered hand, or another suitable end effector configured to pick-up crops cut by the agriculture tool 1114. As another example, the agriculture tool 1114 may be omitted and at least one arm 1112 may include a multi-fingered hand configured to pick or otherwise service the crops 1106. In a further example, the agriculture tool 1114 may be a dispenser configured to apply reagents to the agriculture field 1104 and/or the crops 1106, such as fertilizer, pesticide, herbicide, or another suitable reagent.

The limbed vehicle 1108 may further include a logistical-support interface (not shown) such as, the logistical-support interface 400 (FIG. 4) or 600 (FIG. 6), or the power receiver 1000 (FIG. 10). The limbed vehicle 1108 may also include an equipment-module attachment mechanism such as, the equipment-module attachment mechanism 900 shown in FIG. 9.

In operation, the limbed vehicle 1108 of the system 1100 may be directed to travel on the posts 1102, as previously described with respect to any of the other embodiments, and service selected crops 1106 while supported on one or more posts 1102. Furthermore, the limbed vehicle 1108 may stop on one or more of the posts 1102 so that the limbed vehicle 1108 may receive logistical support from a logistical-support unit associated with at least one of the posts 1102. For example, the limbed vehicle 1108 may re-fuel its fuel tank (if applicable), re-charge its battery (if applicable), receive consumables, or off-load harvested crops 1106 or consumables via the logistical-support unit 800 as the limbed vehicle 1108 travels on the posts 1102 and over the agriculture field 1104.

Figure 12:
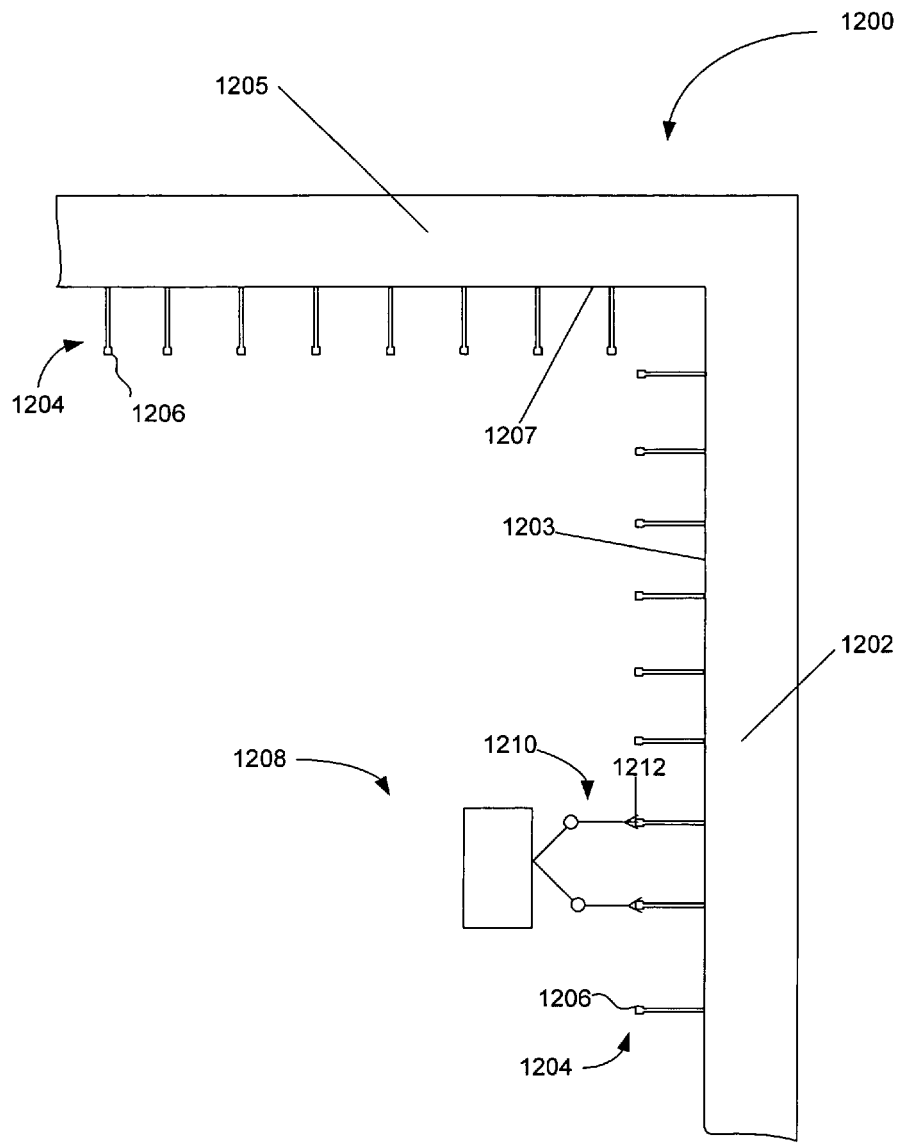
FIG. 12 is a schematic side elevation view of a system including a limbed vehicle and a plurality of spaced posts distributed vertically and horizontally according to another embodiment.

FIG. 12 is a schematic side elevation view of a system 1200 according to yet another embodiment and illustrates the manner in which a limbed vehicle and supports may be used to travel vertically and on overhanging structures. The system 1200 includes a vertical structure 1202 (e.g., a wall) having a plurality of spaced posts 1204 projecting outwardly from a substantially vertical surface 1203 thereof and a horizontal structure 1205 (e.g., a ceiling) having a plurality of the spaced posts 1204 projecting downwardly from a substantially horizontal surface 1207 thereof. At least one post 1204 may include a flange portion 1206 to facilitate gripping by a limbed vehicle 1208 of the system 1200. However, in other embodiments, the flange portion 1206 may be omitted. The limbed vehicle 1208 may include a plurality of limbs 1210, at least one of which includes a gripping mechanism 1212 configured to grip a flange portion 1206 of one of the posts 1204. For example, at least one gripping mechanism 1212 may comprise a multi-fingered hand that is configured to grip a flange portion 1206 with sufficient strength to enable the limbed vehicle 1208 to travel vertically on the posts 1204 projecting from the vertical structure 1202 and horizontally on the downwardly projecting posts 1204 projecting from the horizontal structure 1205.

In operation, the limbed vehicle 1208 may be directed to vertically ascend on the posts 1204 extending from the vertical structure 1202 by moving the limbs 1210 in a walking motion and gripping at least one post 1204 that the individual limbs 1210 contact. The limbed vehicle 1208 may also be directed to travel horizontally on the posts 1204 extending downwardly from the horizontal structure 1205 in a similar manner. Furthermore, the limbed vehicle 1208 may stop on one or more of the posts 1202 so that the limbed vehicle 1208 may receive logistical support from a logistical-support unit associated with at least one of the posts 1204, as previously described in any of the other embodiments.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes, systems, or other technologies described herein can be effected (e.g., hardware, software, or firmware), and that the preferred vehicle will vary with the context in which the processes, systems, or other technologies are deployed. For example, if an implementer determines that speed and accuracy are paramount, the implementer may opt for a mainly hardware or firmware vehicle; alternatively, if flexibility is paramount, the implementer may opt for a mainly software implementation; or, yet again alternatively, the implementer may opt for some combination of hardware, software, or firmware. Hence, there are several possible vehicles by which the processes, devices, or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices or processes via the use of block diagrams, flowcharts, or examples. Insofar as such block diagrams, flowcharts, or examples contain one or more functions or operations, it will be understood by those within the art that each function or operation within such block diagrams, flowcharts, or examples can be implemented, individually or collectively, by a wide range of hardware, software, firmware, or virtually any combination thereof. In one embodiment, several portions of the subject matter described herein may be implemented via Application Specific Integrated Circuits ("ASICs"), Field Programmable Gate Arrays ("FPGAs"), digital signal processors ("DSPs"), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc ("CD"), a Digital Video Disk ("DVD"), a digital tape, a computer memory, etc.; and a transmission type medium such as a digital or an analog communication medium (e.g., a fiber optic cable, a waveguide, a wired communications link, a wireless communication link, etc.).

In a general sense, those skilled in the art will recognize that the various aspects described herein which can be implemented, individually or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes or devices described herein, or a microprocessor configured by a computer program which at least partially carries out processes or devices described herein), electrical circuitry forming a memory device (e.g., forms of random access memory), or electrical circuitry forming a communications device (e.g., a modem, communications switch, or optical-electrical equipment). Those having skill in the art will recognize that the subject matter described herein may be implemented in an analog or digital fashion or some combination thereof.

The herein described components (e.g., steps), devices, and objects and the description accompanying them are used as examples for the sake of conceptual clarity and that various configuration modifications using the disclosure provided herein are within the skill of those in the art. Consequently, as used herein, the specific exemplars set forth and the accompanying description are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural or singular terms herein, those having skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable", to each other to achieve the desired functionality. Specific examples of operably couplable include but are not limited to physically mateable or physically interacting components or wirelessly interactable or wirelessly interacting components or logically interacting or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an"; the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, or A, B, and C together, etc.). Virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those of ordinary skilled in the art. The various aspects and embodiments disclosed herein are for purposes of illustration and are not intended to be limiting.

The invention claimed is:

1. A system, comprising:
a limbed vehicle including a plurality of controllably movable limbs;
a plurality of spaced posts configured to support the limbed vehicle as the limbed vehicle travels thereon using the controllably movable limbs, the plurality of spaced posts being at least partially disposed in a support medium; and
at least one logistical-support unit associated with at least one of the plurality of spaced posts and configured to provide logistical support to the limbed vehicle.

2. The system of claim 1, wherein the at least one logistical-support unit is configured to provide electrical power to the limbed vehicle.

3. The system of claim 2, wherein the at least one logistical-support unit includes an electricity-transmitting mechanism configured to be electrically coupled to an electricity-receiving mechanism of the limbed vehicle.

4. The system of claim 1, wherein:
at least one of the plurality of controllably movable limbs includes a power receiver coupled to a battery of the limbed vehicle; and
the at least one logistical-support unit includes a power transmitter configured to be coupled to the power receiver to charge the battery.

5. The system of claim 4, wherein:
the power receiver includes a wireless receiver; and
the power transmitter includes a wireless transmitter configured to be coupled to the power receiver.

6. The system of claim 4, wherein the power receiver is associated with a foot of the at least one of the controllably movable limbs.

7. The system of claim 1, wherein the at least one logistical-support unit is configured to provide a consumable to the limbed vehicle.

8. The system of claim 1, wherein the at least one logistical-support unit is configured to provide information to the limbed vehicle associated with logistical support capability of the at least one logistical-support unit.

9. The system of claim 1, wherein the limbed vehicle is configured to request information associated with the logistical support capability of the at least one logistical-support unit.

10. The system of claim 1, wherein:
the at least one logistical-support unit includes a fuel-supply device; and
the limbed vehicle includes a fuel port configured to receive the fuel from the fuel-supply device.

11. The system of claim 1, wherein the at least one logistical-support unit is configured to load or un-load an object to or from the limbed vehicle.

12. The system of claim 11, wherein the at least one logistical-support unit includes a robotic arm configured to un-load the objects.

13. The system of claim 1, wherein at least a portion of the plurality of controllably movable limbs of the limbed vehicle includes a plurality of legs.

14. The system of claim 13, wherein another portion of the plurality of controllably movable limbs of the limbed vehicle includes one or more arms.

15. The system of claim 1, wherein at least one of the plurality of controllably movable limbs of the limbed vehicle is configured to carry a tool operably coupled to a controller.

16. The system of claim 1, wherein:
the limbed vehicle includes at least one equipment module removeably attached thereto; and
the at least one logistical-support unit is configured to remove the at least one equipment module from the limbed vehicle and install at least one other equipment module on the limbed vehicle.

17. The system of claim 16, wherein the at least one other equipment module has a functionality different than that of the at least one equipment module.

18. The system of claim 16, wherein the at least one equipment module is carried by at least one of the controllably movable limbs of the limbed vehicle.

19. The system of claim 16, wherein the at least one equipment module includes an agriculture tool.

20. The system of claim 1, wherein at least one of the limbs of the limbed vehicle carries an agriculture tool.

21. The system of claim 1, wherein the support medium includes a surface.

22. The system of claim 21, wherein the surface includes a substantially vertical surface.

23. The system of claim 21, wherein the surface includes a substantially horizontal surface.

24. The system of claim 21, wherein the support medium includes an agriculture field.

25. A limbed vehicle, comprising:
a plurality of controllably movable limbs;
a drive system configured to move the controllably movable limbs to allow travel on a plurality of spaced posts;
a battery coupled to the drive system; and
a power receiver coupled to the battery and included in at least one of the plurality of controllably movable limbs, the power receiver configured to be coupled to a power transmitter associated with at least one of the plurality of spaced posts to charge the battery.

26. The limbed vehicle of claim 25, wherein:
the power receiver includes an electrical current receiver; and
the power transmitter includes an electrical current source configured to be directly coupled to the electrical current receiver.

27. The limbed vehicle of claim 25, wherein:
the power receiver includes a wireless receiver; and
the power transmitter includes a wireless transmitter configured to be wirelessly coupled to the wireless receiver.

28. The limbed vehicle of claim 27, wherein:
the wireless power receiver includes an inductive receiver; and
the wireless power transmitter includes an inductive transmitter configured to be inductively coupled to the inductive receiver.

29. The limbed vehicle of claim 25, wherein the wireless power receiver is included in a foot of the at least one of the plurality of controllably movable limbs.

30. The limbed vehicle of claim 25, further comprising:
an equipment-module attachment mechanism configured to engage at least one equipment module.

31. The limbed vehicle of claim 30, further comprising:
the at least one equipment module removeably attached to the equipment-module attachment mechanism.

32. The limbed vehicle of claim 25, wherein at least one of the plurality of controllably movable limbs is configured to carry at least one equipment module.

33. The limbed vehicle of claim 25, further comprising:
a controller coupled to the drive system; and
an operator interface coupled to the controller and configured to instruct the controller to direct movement of the plurality of controllably movable limbs.

34. The limbed vehicle of claim 33, wherein the controller is configured to be coupled to a remote control system.

35. The limbed vehicle of claim 33, wherein the controller is configured to be coupled to a robotic control system.

36. The limbed vehicle of claim 25, wherein at least a portion of the plurality of controllably movable limbs includes a plurality of legs.

37. The limbed vehicle of claim 36, wherein at least one other portion of the plurality of controllably movable limbs includes one or more arms.

38. A method, comprising:
directing a limbed vehicle to travel on a plurality of spaced posts, wherein the plurality of spaced posts are at least partially disposed in a support medium; and
receiving, at the limbed vehicle, logistical support from a logistical-support unit associated with at least one of the plurality of spaced posts.

39. The method of claim 38, wherein the receiving, at the limbed vehicle, the logistical support from the logistical-support unit associated with at least one of the plurality of spaced posts includes:
receiving electrical power from the logistical-support unit.

40. The method of claim 38, wherein the receiving, at the limbed vehicle, the logistical support from the logistical-support unit associated with at least one of the plurality of spaced posts includes:
coupling a power receiver associated with the limbed vehicle to a power transmitter associated with the at least one of the plurality of spaced posts to charge a battery of the limbed vehicle.

41. The method of claim 38, wherein the receiving, at the limbed vehicle, the logistical support from the logistical-support unit associated with at least one of the plurality of spaced posts includes:
coupling a power receiver associated with one of the controllably movable limbs to a power transmitter associated with the at least one of the plurality of spaced posts to charge a battery of the limbed vehicle.

42. The method of claim 41, wherein the coupling the power receiver associated with one of the controllably movable limbs to the power transmitter associated with the at least one of the plurality of spaced posts to charge a battery of the limbed vehicle includes:
automatically coupling a wireless power transmitter with a wireless power receiver responsive to the one of the controllably movable limbs being in sufficient proximity to the wireless power transmitter.

43. The method of claim 38, wherein receiving, at the limbed vehicle, logistical support from a logistical-support unit associated with at least one of the plurality of spaced posts includes:
inductively coupling an inductive receiver associated with one of the controllably movable limbs to an inductive transmitter associated with the at least of the plurality of spaced posts to charge a battery of the limbed vehicle.

44. The method of claim 38, wherein the receiving, at the limbed vehicle, the logistical support from the logistical-support unit associated with at least one of the plurality of spaced posts includes:
receiving a consumable from the logistical-support unit.

45. The method of claim 44, wherein receiving a consumable from the logistical-support unit includes:
receiving fuel from the logistical-support unit.

46. The method of claim 38, wherein the receiving, at the limbed vehicle, the logistical support from the logistical-support unit associated with at least one of the plurality of spaced posts includes:
receiving supplies from the logistical-support unit.

47. The method of claim 38, wherein the receiving, at the limbed vehicle, the logistical support from the logistical-support unit associated with at least one of the posts includes:
directing the limbed vehicle to cooperate with the logistical-support unit so that the one or more objects carried by the limbed vehicle is off-loaded by the logistical-support unit.

48. The method of claim 38, wherein the receiving, at the limbed vehicle, the logistical support from the logistical-support unit associated with at least one of the posts includes:
directing the limbed vehicle to cooperate with the logistical-support unit so that at least one equipment module carried by the limbed vehicle is removed by the logistical-support unit.

49. The method of claim 48, wherein the receiving, at the limbed vehicle, the logistical support from the logistical-support unit associated with at least one of the posts includes:
   directing the limbed vehicle to cooperate with the logistical-support unit so that at least one other equipment module having a functionality different than that of the at least one equipment module is installed on the limbed vehicle.

50. The method of claim 38, wherein the receiving, at the limbed vehicle, the logistical support from the logistical-support unit associated with at least one of the plurality of spaced posts includes:
   directing the limbed vehicle to cooperate with the logistical-support unit so that at least one equipment module is installed on the limbed vehicle.

51. The method of claim 38:
   further comprising directing the limbed vehicle to stop on at least one of the posts; and
   wherein the receiving, at the limbed vehicle, the logistical support from the logistical-support unit associated with the at least one of the plurality of spaced posts includes receiving, at the limbed vehicle, the logistical support from the logistical-support unit while the limbed vehicle is stopped on the at least one of the plurality of spaced posts.

52. A post network, comprising:
   a plurality of spaced posts configured to support a limbed vehicle as the limbed vehicle travels thereon, the plurality of spaced posts being at least partially disposed in a support medium; and
   at least one logistical-support unit associated with at least one of the plurality of spaced posts, the logistical-support unit configured to provide logistical support to the limbed vehicle.

53. The post network of claim 52, wherein the logistical-support unit is attached to the at least one of the plurality of spaced posts.

54. The post network of claim 52, wherein the logistical-support unit is positioned in proximity to the at least one of the plurality of spaced posts.

55. The post network of claim 52, wherein the logistical-support unit is configured to provide electrical power to the limbed vehicle.

56. The post network of claim 52, wherein the logistical-support unit includes an electricity-transmitting mechanism configured to be electrically coupled to an electricity-receiving mechanism of the limbed vehicle.

57. The post network of claim 52, wherein the logistical-support unit includes a wireless transmitter.

58. The post network of claim 57, wherein the wireless transmitter includes an inductive transmitter.

59. The post network of claim 52, wherein the logistical-support unit is configured to provide a consumable to the limbed vehicle.

60. The post network of claim 59, wherein the logistical-support unit includes a fuel-supply device.

61. The post network of claim 52, wherein the logistical-support unit is configured to un-load an object carried by the limbed vehicle.

62. The post network of claim 61, wherein the logistical-support unit includes a robotic arm configured to un-load the object.

63. The post network of claim 52, wherein the support medium includes a surface.

64. The post network of claim 63, wherein the surface includes a substantially vertical surface.

65. The post network of claim 63, wherein the surface includes a substantially horizontal surface.

66. The post network of claim 63, wherein the support medium includes an agriculture field.

67. The post network of claim 63, wherein the at least one of the plurality of spaced posts includes a limb-interfacing surface located at least proximate to the surface of the support medium.

68. The post network of claim 63, wherein the at least one of the plurality of spaced posts projects beyond the surface of the support medium.

* * * * *